(12) United States Patent
Noumura et al.

(10) Patent No.: US 10,330,025 B2
(45) Date of Patent: Jun. 25, 2019

(54) VALVE DEVICE

(71) Applicant: DENSO CORPORATION, Kariya, Aichi-pref. (JP)

(72) Inventors: Ryo Noumura, Kariya (JP); Yasushi Kawano, Kariya (JP); Tohru Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/524,728

(22) PCT Filed: Dec. 15, 2015

(86) PCT No.: PCT/JP2015/006251
§ 371 (c)(1),
(2) Date: May 5, 2017

(87) PCT Pub. No.: WO2016/103636
PCT Pub. Date: Jun. 30, 2016

(65) Prior Publication Data
US 2017/0342914 A1    Nov. 30, 2017

(30) Foreign Application Priority Data
Dec. 25, 2014    (JP) .................................. 2014-263257

(51) Int. Cl.
*F02D 9/10*    (2006.01)
*F02D 11/10*    (2006.01)
(Continued)

(52) U.S. Cl.
CPC ............... *F02D 9/10* (2013.01); *F02D 9/106* (2013.01); *F02D 11/10* (2013.01); *F16C 33/783* (2013.01);
(Continued)

(58) Field of Classification Search
CPC ... F02D 9/00; F02D 9/10; F02D 9/105; F02D 9/106; F02D 41/00; F02D 41/0002;
(Continued)

(56) References Cited

U.S. PATENT DOCUMENTS 5,275,375 A * 1/1994 Semence ............... F02D 9/1055
123/400
5,823,165 A * 10/1998 Sato ........................ F02D 11/10
123/361

(Continued)

FOREIGN PATENT DOCUMENTS

| JP | 2009-180097 | 8/2009 |
|---|---|---|
| JP | 2009-204142 | 9/2009 |
| JP | 2012-13023 | 1/2012 |

OTHER PUBLICATIONS

International Search Report for PCT/JP2015/006251, dated Mar. 8, 2016, 4 pages.

(Continued)

*Primary Examiner* — Hung Q Nguyen
*Assistant Examiner* — Johnny H Hoang
(74) *Attorney, Agent, or Firm* — Nixon & Vanderhye P.C.

(57) ABSTRACT

A surface of a bearing member on a flow passage forming chamber-side is disposed to be exposed to the chamber. The bearing member includes a contact part, with which a side surface of a butterfly valve that is opposed to the bearing member is in contact, on at least a part of the surface of the bearing member on the chamber-side. The bearing member is a radial ball bearing and includes an outer bearing ring that is fitted to an inner periphery of a shaft hole, so that its axial displacement relative to a body is restricted, an inner bearing ring that is fitted on an outer periphery of a rotation shaft radially inward of the outer bearing ring, and a rolling element disposed between the outer bearing ring and the (Continued)

inner bearing ring. The contact part is provided on a surface of the inner bearing ring on the chamber-side.

10 Claims, 14 Drawing Sheets

(51) Int. Cl.
    *F16K 1/22*     (2006.01)
    *F16K 1/226*     (2006.01)
    *F16C 33/78*     (2006.01)
    *F16K 1/32*     (2006.01)
    *F16C 19/06*     (2006.01)
    *F16C 19/10*     (2006.01)
    *F16C 19/52*     (2006.01)
    *F16C 21/00*     (2006.01)

(52) U.S. Cl.
    CPC .......... *F16C 33/7889* (2013.01); *F16K 1/224* (2013.01); *F16K 1/2268* (2013.01); *F16C 19/06* (2013.01); *F16C 19/10* (2013.01); *F16C 19/52* (2013.01); *F16C 21/00* (2013.01); *F16C 2361/91* (2013.01); *F16K 1/22* (2013.01); *F16K 1/32* (2013.01)

(58) Field of Classification Search
    CPC .. F16K 27/0218; F16K 27/0263; F16C 33/78; F16C 33/7823; F16C 33/7826
    USPC ................ 123/336, 337, 361, 396, 399, 527
    See application file for complete search history.

(56) References Cited

U.S. PATENT DOCUMENTS

| | | | |
|---|---|---|---|
| 6,761,348 B2* | 7/2004 | Michels | F02D 9/104 251/305 |
| 7,219,651 B2* | 5/2007 | Yamamoto | F02D 9/101 123/306 |
| 7,225,792 B2* | 6/2007 | Nakamura | F02D 9/106 123/336 |
| 8,662,474 B2* | 3/2014 | Schlarman | F16C 19/381 251/305 |
| 9,970,450 B1* | 5/2018 | Kelly | F04D 29/059 |
| 2004/0170346 A1 | 9/2004 | Komeda et al. | |
| 2005/0097745 A1 | 5/2005 | Arai et al. | |
| 2006/0000997 A1 | 1/2006 | Shimada et al. | |
| 2007/0102661 A1 | 5/2007 | Isogi et al. | |
| 2008/0000458 A1 | 1/2008 | Isogai et al. | |
| 2008/0223450 A1 | 9/2008 | Kino et al. | |
| 2011/0114061 A1* | 5/2011 | Mase | F02D 9/105 123/399 |
| 2012/0051680 A1* | 3/2012 | Ishikawa | F16C 33/3887 384/462 |
| 2012/0114278 A1* | 5/2012 | Winkelmann | F16C 33/7853 384/466 |
| 2012/0223266 A1* | 9/2012 | Furukoshi | F02D 9/106 251/305 |
| 2014/0185975 A1* | 7/2014 | Furukoshi | F16C 33/7853 384/486 |

OTHER PUBLICATIONS

Written Opinion of the ISA for PCT/JP2015/006251, dated Mar. 8, 2016, 5 pages.

* cited by examiner

THE OTHER END SIDE ←→ ONE END SIDE
AXIAL DIRECTION

FLOW PASSAGE FORMING CHAMBER SIDE ←——→ OPPOSITE-FLOW PASSAGE FORMING CHAMBER SIDE
AXIAL DIRECTION

VALVE DEVICE

This application the U.S. national phase of International Application No. PCT/JP2015/006251 filed on Dec. 15, 2015, which designated the U.S. and claims priority to Japanese Patent Application No. 2014-263257 filed on Dec. 20, 2014, the entire contents of each of which are incorporated herein by reference.

CROSS REFERENCE TO RELATED APPLICATION

This application is based on Japanese Patent Application No. 2014-263257 filed on Dec. 25, 2014, the disclosure of which is incorporated herein by reference.

TECHNICAL FIELD

The present disclosure relates to a valve device for opening or closing a fluid flow passage.

BACKGROUND ART

For a conventional valve device 100, there is known a throttle valve device including a body 101 that defines an intake passage, and a butterfly valve 102 that is supported rotatably in the body 101 and is driven by an actuator (not shown), as illustrated in FIG. 16.

The body 101 includes a flow passage forming chamber 103 that is a part of the intake passage, and a shaft hole 105 which opens into the flow passage forming chamber 103 and through which a rotation shaft 104 of the butterfly valve 102 passes. Bearings 106 that support the rotation shaft 104 are arranged between the shaft hole 105 and the rotation shaft 104.

In this valve device 100, a clearance 110 may be formed between the butterfly valve 102 and the bearing 106, which are opposed to each other in the axial direction of the rotation shaft 104 (left-right direction in FIG. 16). In the case of this structure, the clearance 110 is allowed for the thermal expansion of the butterfly valve 102 to be able to avoid a biting phenomenon (phenomenon of the butterfly valve 102 crimped against the bearing 106 to be incapable of rotating).

However, the clearance 110 normally serves as a flow passage that causes the leakage of intake air from the upstream side to the downstream side of the butterfly valve 102 (in the thickness direction of a plane of paper of FIG. 16) when the butterfly valve 102 is fully closed. Thus, the flow rate of leaking intake air (hereinafter referred to as an intake air leak flow rate) increases.

As the measures against this, Patent Documents 1, 2 disclose the structure of the butterfly valve and the bearing which are in contact. Specifically, in this structure, the surface of the bearing on the flow passage forming chamber-side is exposed to the flow passage forming chamber so that the butterfly valve can be in sliding contact with the bearing. Although this reduces the intake air leak flow rate, this structure may render the butterfly valve incapable of rotating due to the occurrence of the biting phenomenon when the butterfly valve is thermally expanded.

Thus, there is a demand for the structure that can reduce the leakage of fluid from the upstream side to the downstream side of the butterfly valve when fully closed and that can avoid the phenomenon of the butterfly valve incapable of rotating when thermally expanded.

PRIOR ART DOCUMENTS

Patent Documents

Patent Document 1: JP 4739128 B2
Patent Document 2: JP 4933082 B2

SUMMARY OF INVENTION

The present disclosure addresses the above issues. Thus, it is an objective of the present disclosure to provide a valve device that can reduce a leakage of fluid from an upstream side to a downstream side of a butterfly valve when fully closed and that can avoid a phenomenon of the butterfly valve incapable of rotating when thermally expanded.

(1) To achieve the objective, a valve device in a first aspect of the present disclosure includes a body, a butterfly valve, a rotation shaft, a shaft hole, and a bearing member, which will be described below. The body includes a flow passage forming chamber, which is configured as a part of a fluid flow passage communicating with a combustion chamber of an internal-combustion engine. The butterfly valve is accommodated rotatably in the flow passage forming chamber to adjust a flow rate through the fluid flow passage. The rotation shaft rotates integrally with the butterfly valve. The shaft hole is formed in the body to open into the flow passage forming chamber, and the rotation shaft passes through the shaft hole. The bearing member is disposed in the shaft hole to support the rotation shaft.

A surface of the bearing member on the flow passage forming chamber-side is disposed to be exposed to the flow passage forming chamber. The bearing member includes a contact part, with which a side surface of the butterfly valve that is opposed to the bearing member is in contact, on at least a part of the surface of the bearing member on the flow passage forming chamber-side.

The bearing member is a radial ball bearing and includes an outer bearing ring that is fitted to an inner periphery of the shaft hole, so that its axial displacement relative to the body is restricted, an inner bearing ring that is fitted on an outer periphery of the rotation shaft radially inward of the outer bearing ring, and a rolling element that is disposed between the outer bearing ring and the inner bearing ring.

The contact part is provided on a surface of the inner bearing ring on the flow passage forming chamber-side. Thus, the butterfly valve is in contact only with the inner bearing ring, and is not in contact with the outer bearing ring.

Consequently, at least a part of the surface of the bearing member on the flow passage forming chamber-side is structured to include the contact part, with which the side surface of the butterfly valve that is opposed to the bearing member is in contact. This can thus reduce the leakage of fluid from an upstream side to a downstream side of the butterfly valve when fully closed, as compared with the structure without the contact part (conventional structure having a clearance).

The butterfly valve is in contact only with the inner bearing ring. Thus, even though the butterfly valve is crimped against the inner bearing ring due to the thermal expansion of the butterfly valve, the inner bearing ring can rotate relative to the outer bearing ring and thus the butterfly valve can also rotate together. Therefore, there is provided the structure that can reduce the leakage of fluid from the upstream side to the downstream side of the butterfly valve when fully closed and that can avoid the phenomenon of the butterfly valve incapable of rotating when thermally expanded.

In addition, if the inner bearing ring is permitted to be displaced relative to the rotation shaft in the axial direction, the deformation of the butterfly valve due to its thermal expansion can be absorbed by the axial play of the ball bearing.

(2) To achieve the objective, in a valve device in a second aspect of the present disclosure, the bearing member is a thrust ball bearing and includes a shaft-side bearing ring that is fixed to the rotation shaft, a body-side bearing ring that is fixed to the body, and a rolling element that is disposed between the shaft-side bearing ring and the body-side bearing ring. The butterfly valve is in contact only with the shaft-side bearing ring, and is not in contact with the body-side bearing ring.

Consequently, because the butterfly valve is in contact only with the shaft-side bearing ring, even though the butterfly valve is crimped against the shaft-side bearing ring due to the thermal expansion of the butterfly valve, the shaft-side bearing ring can rotate relative to the body-side bearing ring and thus the butterfly valve can also rotate together. Therefore, there is provided the structure that can reduce the leakage of fluid from the upstream side to the downstream side of the butterfly valve when fully closed and that can avoid the phenomenon of the butterfly valve incapable of rotating when thermally expanded.

(3) To achieve the objective, in the valve device in a third aspect of the present disclosure, both end parts of the rotation shaft of the butterfly valve are borne respectively by the thrust ball bearings. When the bearing member that bears one end part of the rotation shaft is referred to as a first bearing member, and the bearing member that bears the other end part of the rotation shaft is referred to as a second bearing member, the butterfly valve is in contact with the shaft-side bearing ring at the first bearing member and with the body-side bearing ring at the second bearing member. The butterfly valve is not in contact with the body-side bearing ring at the first bearing member or with the shaft-side bearing ring at the second bearing member.

Consequently, the deformation of the butterfly valve due to its thermal expansion can be absorbed by the axial play of the first bearing member and the axial play of the second bearing member. Therefore, there is provided the structure that can reduce the leakage of fluid from the upstream side to the downstream side of the butterfly valve when fully closed and that can avoid the phenomenon of the butterfly valve incapable of rotating when thermally expanded.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
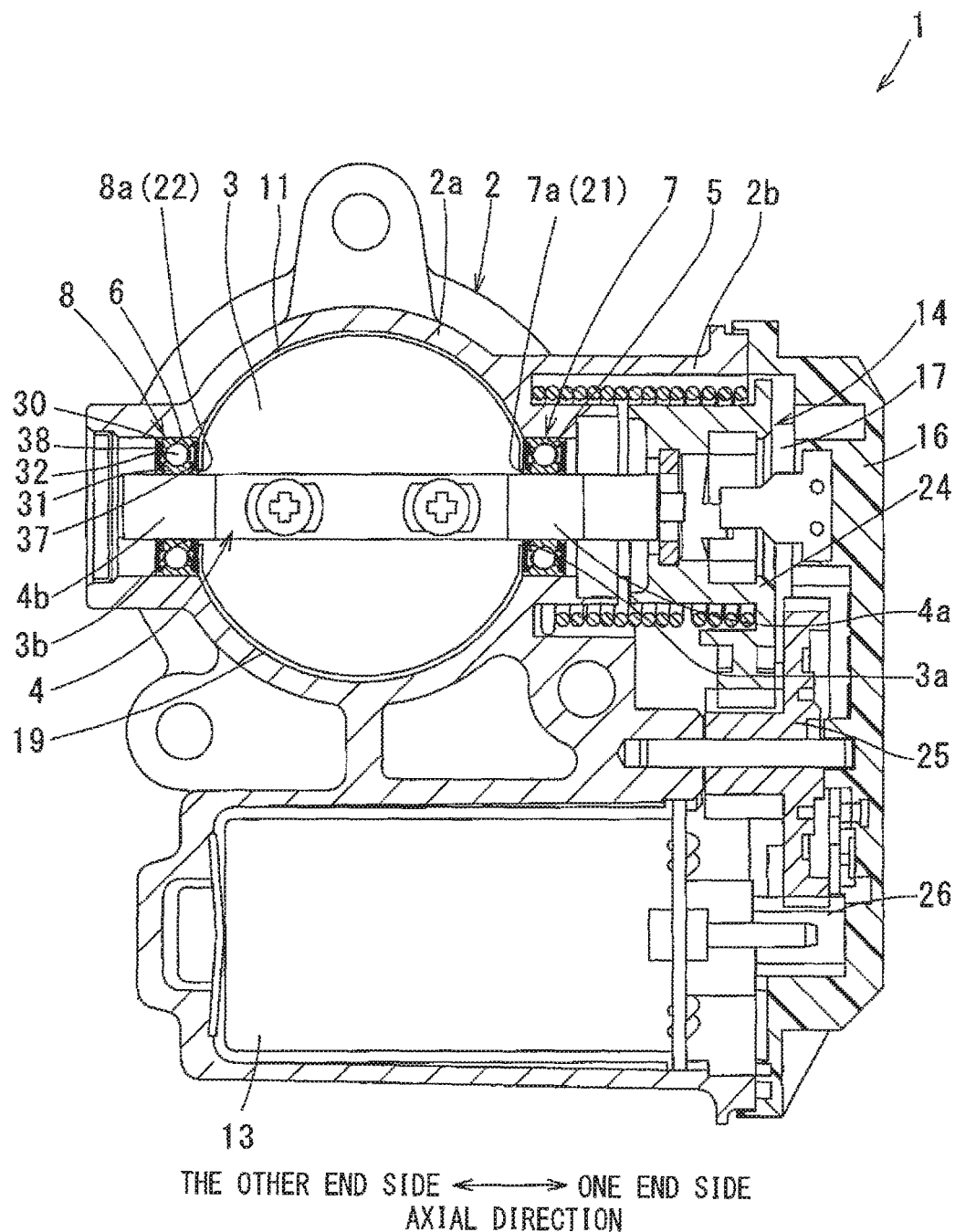
FIG. 1 is a sectional view illustrating an entire configuration of a valve device in accordance with a first embodiment.
Figure 2:
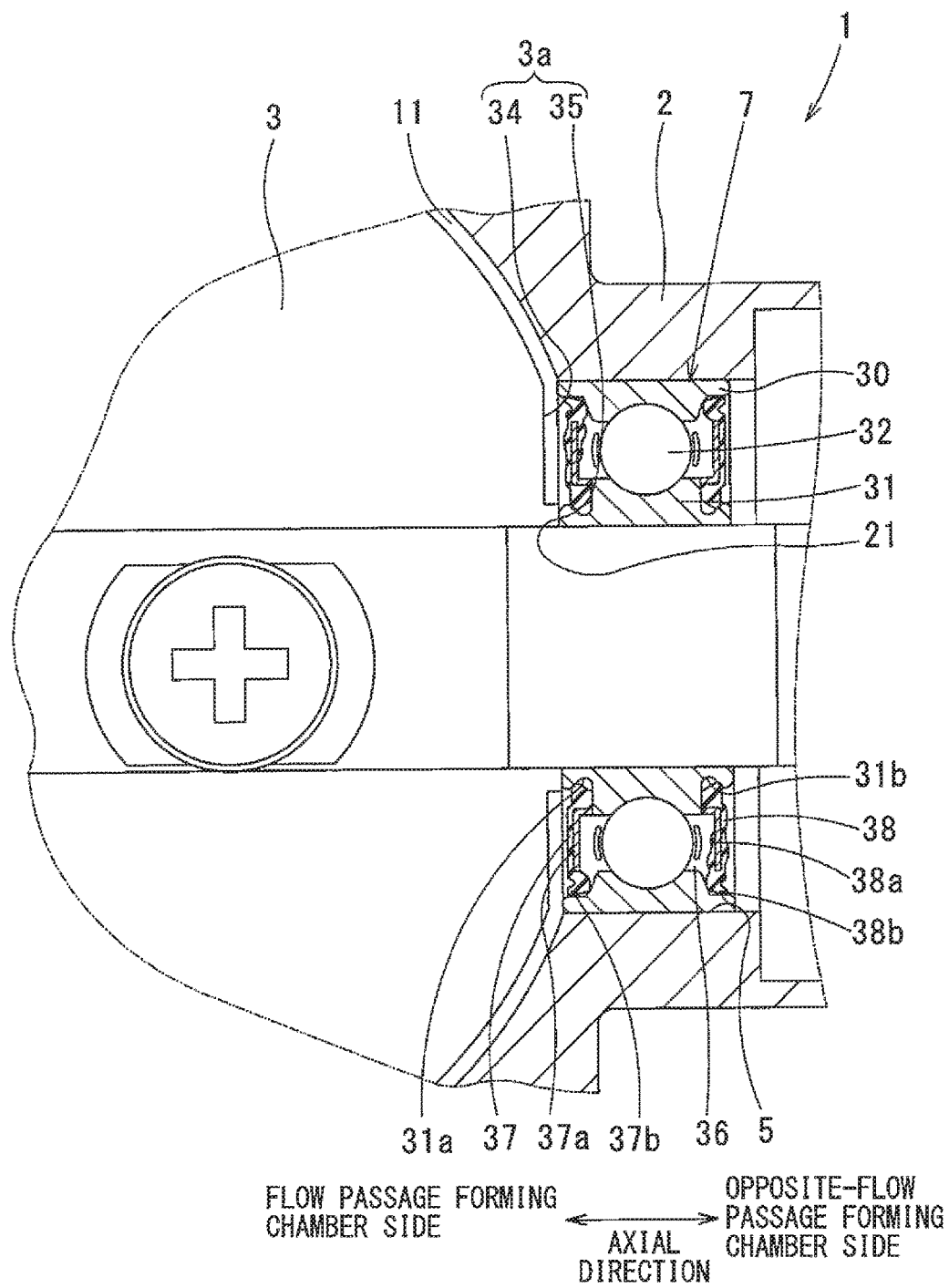
FIG. 2 is an enlarged sectional view illustrating a main part of the valve device of the first embodiment.

Embodiments will be explained in detail below.
(First Embodiment)

The configuration of a first embodiment will be described below. A valve device 1 of the present embodiment will be explained with reference to FIGS. 1 to 6. The valve device 1 of the present embodiment is a throttle valve device for a diesel engine, and is a valve device for adjusting the amount of air drawn into a combustion chamber of an internal-combustion engine.

The valve device 1 includes a body 2, a butterfly valve 3, a rotation shaft 4, a first shaft hole 5, a second shaft hole 6, a first bearing member 7, and a second bearing member 8, which will be described below.

The body 2 is formed from metal, and includes a cylindrical part 2a that defines a flow passage forming chamber 11 serving as a part of an intake passage communicating with the combustion chamber of the internal-combustion engine, and a gear housing part 2b for accommodating a motor 13 and a gear deceleration device 14, which will be described later.

A resin housing cover 16 is joined to the open end surface of the gear housing part 2b, and the space between the housing cover 16 and the gear housing part 2b serves as an actuator chamber 17 in which the motor 13 and the gear deceleration device 14 are accommodated.

The butterfly valve 3 is accommodated rotatably in the flow passage forming chamber 11 to adjust a flow rate through the intake passage. The butterfly valve 3 is fixed to the rotation shaft 4, and is formed into a circular plate shape from a metallic material or a resin material.

A clearance 19 that permits some fluid to pass therethrough even when the butterfly valve 3 is fully closed is formed between the butterfly valve 3 and the body 2. This clearance 19 becomes narrower than its original set size when the butterfly valve 3 or the body 2 is thermally expanded.

The rotation shaft 4 is formed from a metallic material, and is supported rotatably by the body 2 with the radial direction of the cylindrical part 2a as its axial direction.

The first shaft hole 5 is formed in the body 2 to open into the flow passage forming chamber 11, and one axial end part 4a of the rotation shaft 4 passes through the first shaft hole 5. The second shaft hole 6 is formed in the body 2 to open into the flow passage forming chamber 11, and the other axial end part 4b of the rotation shaft 4 passes through the second shaft hole 6.

The first bearing member 7 is disposed in the first shaft hole 5 to support the rotation shaft 4. The first bearing member 7 is disposed such that its surface 7a on the flow passage forming chamber 11-side in the axial direction is exposed to the flow passage forming chamber 11. The first bearing member 7 includes a first contact part 21, with which a side surface 3a of the butterfly valve 3 opposed to the first bearing member 7 is in contact, on at least a part of the surface 7a of the first bearing member 7 on the flow passage forming chamber 11-side.

The second bearing member 8 is disposed in the second shaft hole 6 to support the rotation shaft 4. The second bearing member 8 is disposed such that its surface 8a on the flow passage forming chamber 11-side in the axial direction is exposed to the flow passage forming chamber 11. The second bearing member 8 includes a second contact part 22, with which a side surface 3b of the butterfly valve 3 opposed to the second bearing member 8 is in contact, on at least a part of the surface 8a of the second bearing member 8 on the flow passage forming chamber 11-side.

The motor 13 is an electric actuator that can rotate the rotation shaft 4 forward and backward upon its energization. The gear deceleration device 14 decelerates the rotational speed of the motor 13 to a predetermined rotational speed of the rotation shaft 4, and includes a valve gear 24 that is fixed to the rotation shaft 4, an intermediate gear 25 that rotates in engagement with this valve gear 24, and a pinion gear 26 that is fixed to the output shaft of the motor 13 to rotate the butterfly valve 3.

In the present embodiment, one end side of the rotation shaft 4 (right side in FIG. 1) projects into the actuator chamber 17, and the valve gear 24 is fixed to the one end of the rotation shaft 4. Thus, the valve gear 24 receives the driving force from the motor 13 to rotate, so that the valve gear 24, the rotation shaft 4, and the butterfly valve 3 rotate integrally.

The characteristics of the present embodiment will be described below. The valve device 1 of the present embodiment has the characteristics explained below. The first bearing member 7 and the second bearing member 8 are both radial ball bearings, each including an outer bearing ring 30, an inner bearing ring 31, and a rolling element 32. The bearing structure using the first bearing member 7 and the bearing structure using the second bearing member 8 are similar. Thus, these structures will be explained below with reference to FIGS. 2 and 3, with the bearing structure using the first bearing member 7 as their representative.

The outer bearing ring 30 is fitted to the inner periphery of the first shaft so hole 5, so that its displacement relative to the body 2 in the axial direction is restricted. For example, the outer bearing ring 30 of the present embodiment is press-fitted and fixed to the inner periphery of the first shaft hole 5.

The inner bearing ring 31 is located radially inward of the outer bearing ring 30 to be fitted on the outer periphery of the rotation shaft 4. In the present embodiment, the inner bearing ring 31 is fitted to the outer periphery of the rotation shaft 4 by loose-fitting to permit the displacement of the inner bearing ring 31 relative to the rotation shaft 4 in the axial direction.

The rolling elements 32 are disposed in the space that is located between the outer bearing ring 30 and the inner bearing ring 31 in the radial direction, and are more than one steel ball that roll between the outer bearing ring 30 and the inner bearing ring 31.

The first contact part 21 that is in contact with the butterfly valve 3 is provided on the surface of the inner bearing ring 31 on the flow passage forming chamber 11-side. Thus, the side surface 3a of the butterfly valve 3 is not in contact with the outer bearing ring 30, and is in contact only with the inner bearing ring 31.

The side surface 3a of the butterfly valve 3 includes a non-contact surface 34 that is a surface parallel to the surface of the outer bearing ring 30 on the flow passage forming chamber 11-side and that is opposed to the outer bearing ring 30 with a predetermined clearance therebetween, and a contact surface 35 that is provided to project from the non-contact surface 34 toward the first bearing member 7 to be in contact with the first contact part 21.

The first bearing member 7 includes a sealing member 37 that seals the flow passage forming chamber 11-side opening of a space 36 which is located between the inner bearing ring 31 and the outer bearing ring 30 and in which the rolling elements 32 are located. In addition to the sealing member 37, the first bearing member 7 of the present embodiment also includes a sealing member 38 that seals the opening of the space 36 away from the flow passage forming chamber 11.

Figure 3:
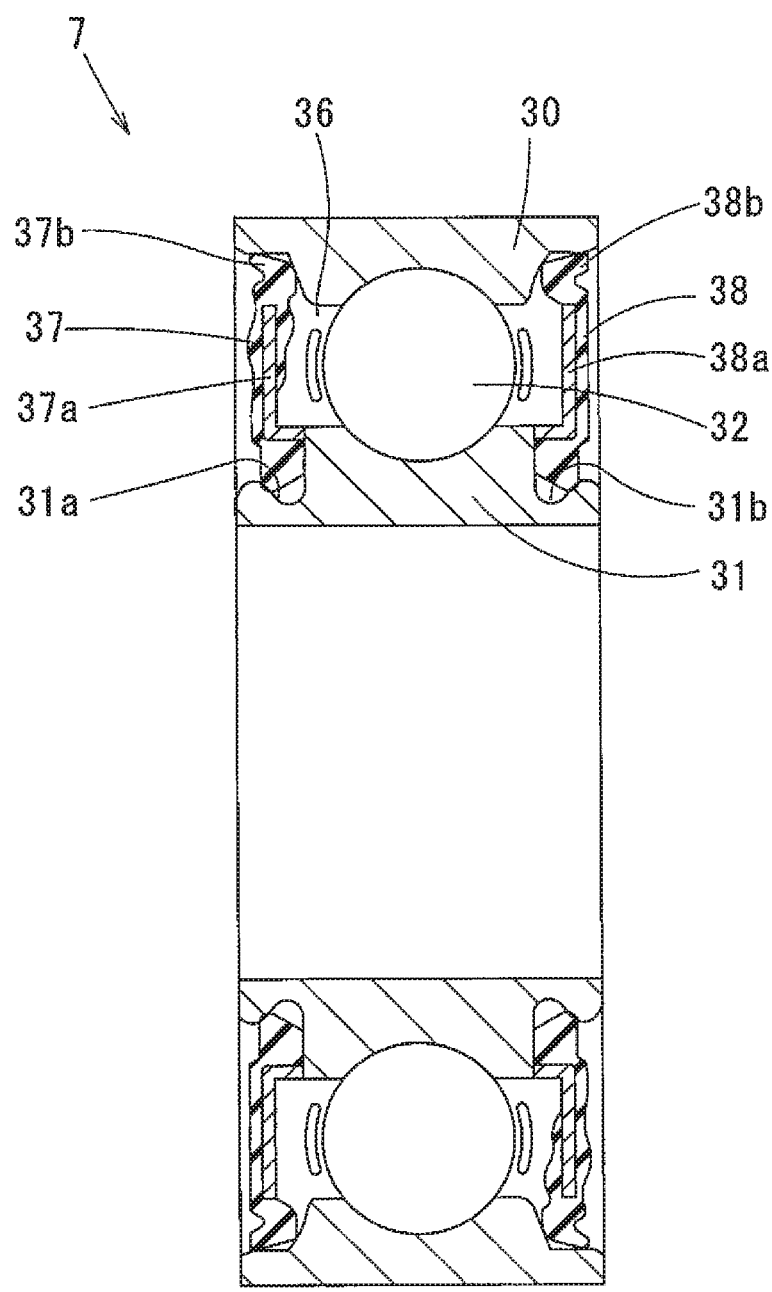
FIG. 3 is a cross-sectional view illustrating a bearing member according to the first embodiment.

As illustrated in FIG. 3, the sealing members 37, 38 are both annular rubber seals, and metal rings 37a, 38a are respectively embedded therein. The sealing member 37 is disposed on the flow passage forming chamber 11-side of the rolling element 32 in the axial direction between the inner bearing ring 31 and the outer bearing ring 30. The sealing member 38 is disposed on an opposite side of the rolling element 32 from the flow passage forming chamber 11 in the axial direction between the inner bearing ring 31 and the outer bearing ring 30.

The end part of the sealing member 37 on the inner bearing ring 31-side is press-fitted and fixed into a recessed part 31a that is provided at the inner bearing ring 31. The end part of the sealing member 37 on the outer bearing ring 30-side is a lip 37b that can be in sliding contact with the outer bearing ring 30.

The end part of the sealing member 38 on the inner bearing ring 31-side is press-fitted and fixed into a recessed part 31b that is provided at the inner bearing ring 31. The end part of the sealing member 38 on the outer bearing ring 30-side is a lip 38b that can be in sliding contact with the outer bearing ring 30.

Thus, the sealing members 37, 38 of the present embodiment are structured to rotate together with the inner bearing ring 31 and to be in sliding contact with the outer bearing ring 30. Alternatively, the sealing members 37, 38 may be structured to rotate together with the outer bearing ring 30 and to be in sliding contact with the inner bearing ring 31.

The bearing structure using the first bearing member 7 has been described above as a representative, but the bearing structure using the second bearing member 8 is similar to this (see FIG. 1). Specifically, the second bearing member 8 includes an outer bearing ring 30 that is fitted to the inner periphery of the second shaft hole 6, so that its displacement relative to the body 2 in the axial direction is restricted, an inner bearing ring 31 that is fitted on the outer periphery of the rotation shaft 4, and a rolling element 32 that is disposed between the outer bearing ring 30 and the inner bearing ring 31.

A second contact part 22 that is in contact with the butterfly valve 3 is provided on the surface of the inner bearing ring 31 on the flow passage forming chamber 11-side. The second bearing member 8 also includes sealing members 37, 38.

The operation and effects of the present embodiment will be described below. In the present embodiment, the first bearing member 7 and the second bearing member 8, which support the rotation shaft 4 of the butterfly valve 3, are radial ball bearings, and the side surfaces 3a, 3b of the butterfly valve 3 are not in contact with the respective outer bearing rings 30, and are in contact only with the respective inner bearing rings 31.

Figure 16:
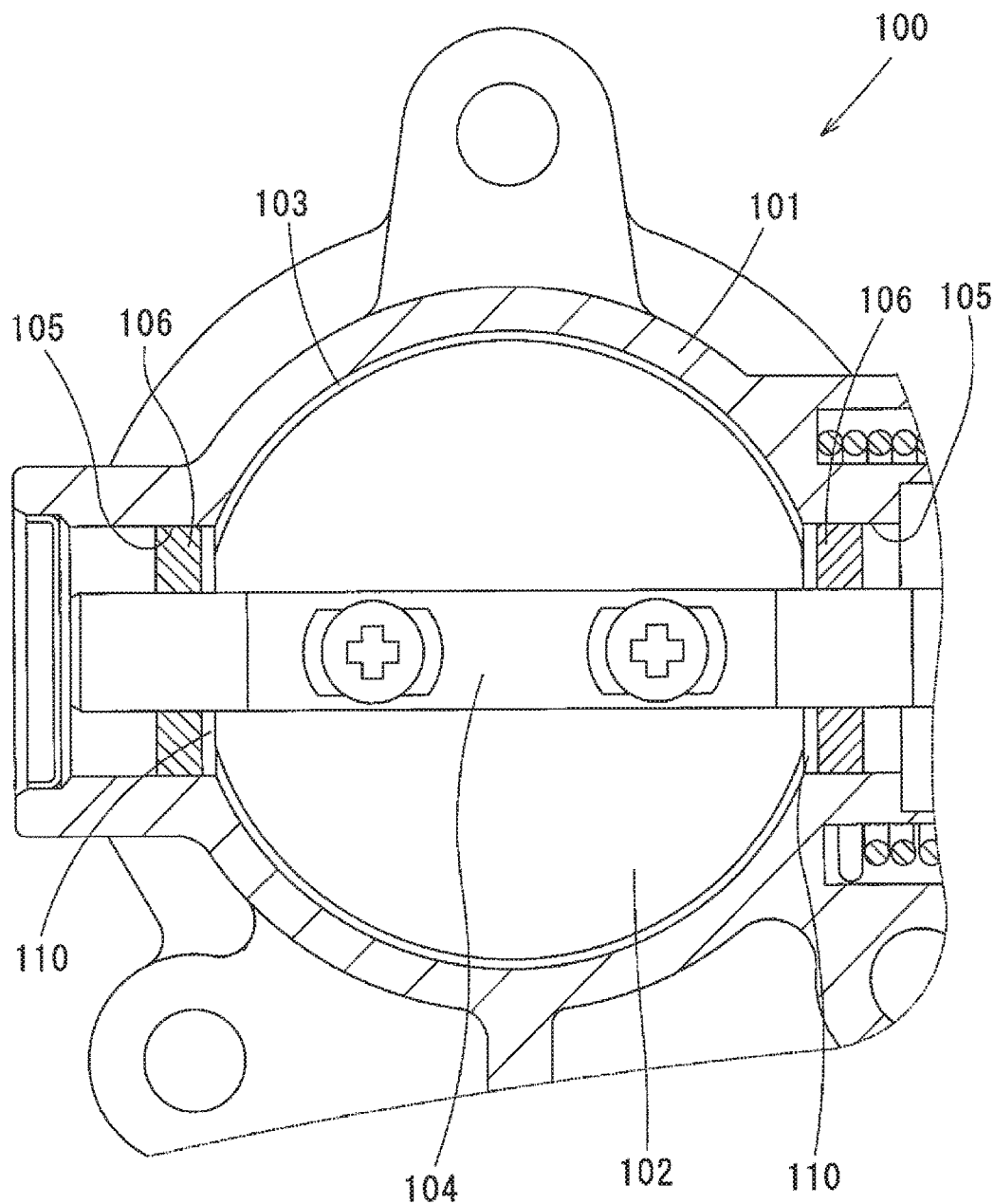
FIG. 16 is an enlarged sectional view illustrating a main part of a previously proposed valve device.

Consequently, the butterfly valve 3 is structured to be in contact with at least a part of the surfaces of the first bearing member 7 and the second bearing member 8 on the flow passage forming chamber 11-side. This can thus reduce the leakage of fluid from an upstream side to a downstream side of the butterfly valve 3 when fully closed, as compared with the conventional structure (structure having the clearance 110 between the bearing 106 and the butterfly valve 102 as illustrated in FIG. 16).

The butterfly valve 3 is in contact only with the inner bearing ring 31. Thus, even though the butterfly valve 3 is crimped against the inner bearing ring 31 due to the thermal expansion of the butterfly valve 3, the inner bearing ring 31 can rotate relative to the outer bearing ring 30 and thus the butterfly valve 3 so can also rotate together with the inner bearing ring 31.

Therefore, there is provided the structure that can reduce the leakage of fluid from the upstream side to the downstream side of the butterfly valve 3 when fully closed and that can avoid the phenomenon of the butterfly valve 3 incapable of rotating when thermally expanded.

Figure 4:
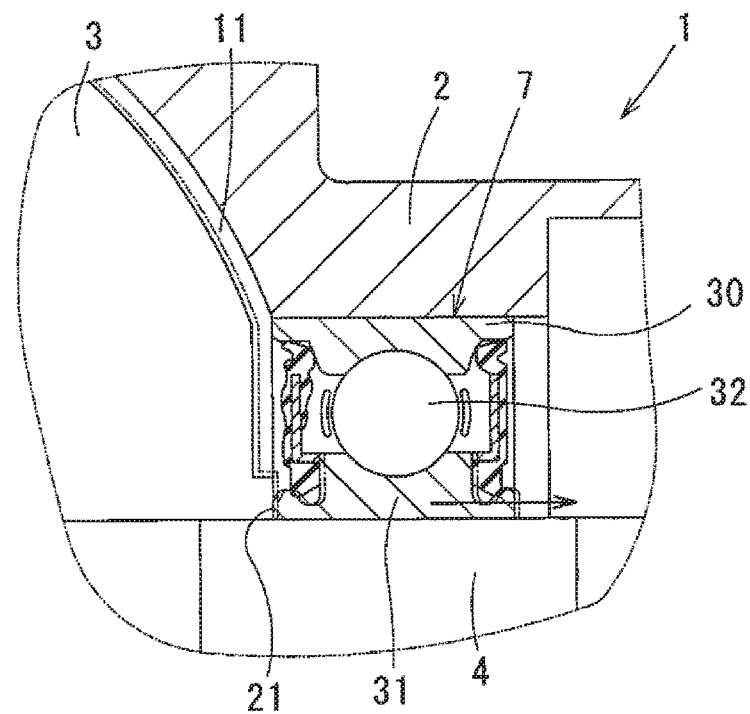
FIG. 4 is a diagram illustrating operation and effects of the valve device of the first embodiment.

The inner bearing ring 31 of the present embodiment is permitted to be displaced relative to the rotation shaft 4 in the axial direction. Consequently, the deformation of the butterfly valve 3 due to its thermal expansion can be absorbed by a slight movement made in the axial direction in the ball bearing as illustrated in FIG. 4.

The ball bearing normally has small backlashes (slight movement) between the inner bearing ring 31 and the rolling element 32, and between the rolling element 32 and the outer bearing ring 30. Thus, the deformation of the butterfly valve 3 due to its thermal expansion is absorbed using this slight movement of the ball bearing in the present embodiment. This can reduce the crimping of the butterfly valve 3 against the inner bearing ring 31. Therefore, this structure can more reliably avoid the phenomenon of the butterfly valve 3 incapable of rotating when thermally expanded.

Each of the first bearing member 7 and the second bearing member 8 of the present embodiment includes the sealing member 37 that seals the flow passage forming chamber 11-side opening of the space 36 between the inner bearing ring 31 and the outer bearing ring 30. Consequently, the leak of fluid flowing from the flow passage forming chamber 11 through the space 36 toward the outside of the flow passage forming chamber 11 can be prevented by the sealing member 37.

Figure 5:
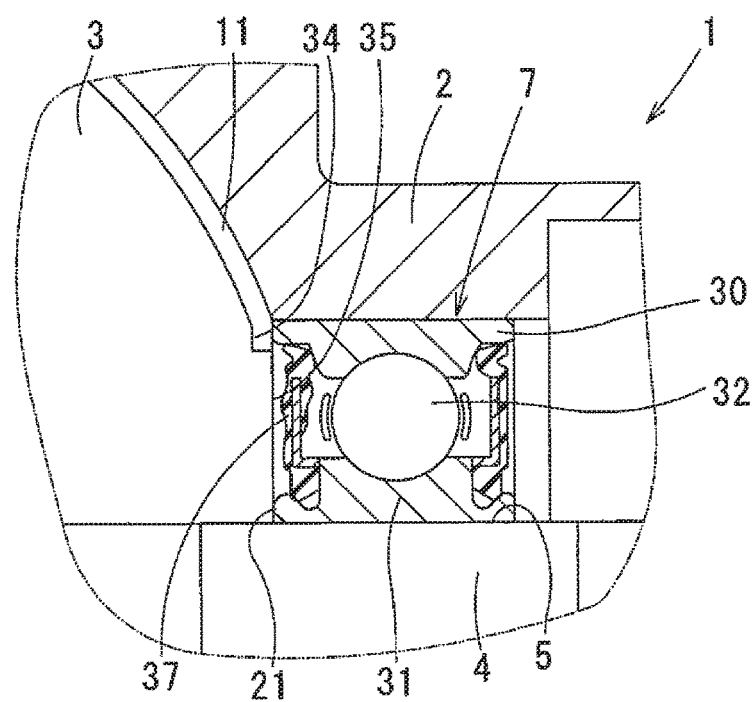
FIG. 5 is an enlarged sectional view illustrating the main part of the valve device of the first embodiment.
Figure 6:
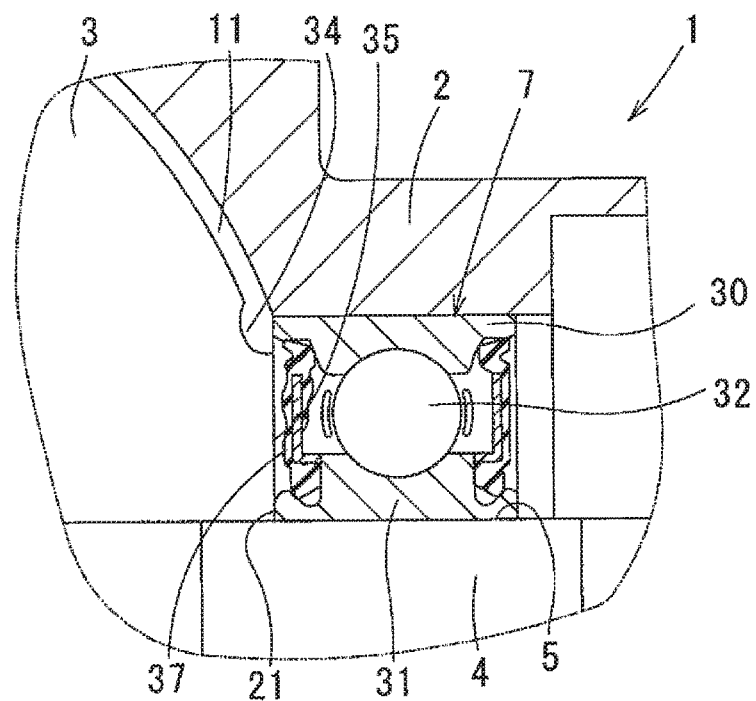
FIG. 6 is an enlarged sectional view illustrating the main part of the valve device of the first embodiment.

In a modification to the first embodiment, a part of the contact surface 35 of the butterfly valve 3 may be opposed to the sealing member 37 with a clearance therebetween in the axial direction, as illustrated in FIG. 5. As illustrated in FIG. 6, the side surface of the butterfly valve 3 near the outer bearing ring 30 may be slightly notched. In this manner, the butterfly valve of the conventional art is notched not to be in contact with the outer bearing ring, thus producing similar effects to the first embodiment.

(Second Embodiment)

Figure 7:
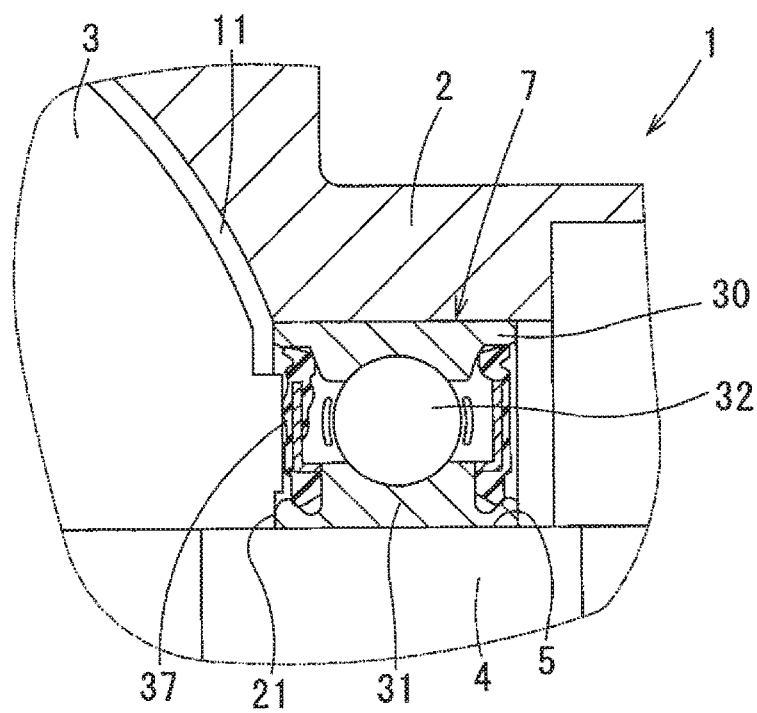
FIG. 7 is an enlarged sectional view illustrating a main part of a valve device in accordance with a second embodiment.

A valve device 1 of a second embodiment will be described with reference to FIG. 7 with a focus on its differences from the first embodiment. The same reference numerals as the first embodiment indicate their corresponding functional components, and their foregoing explanations are referred to.

In the present embodiment, the side surface of a butterfly valve 3 that is opposed to a first bearing member 7 is in contact with a sealing member 37 as well as with a first contact part 21 which is provided at an inner bearing ring 31. Although not shown, a second bearing member 8 also has a similar structure to the above. This can further reduce the leakage of fluid from an upstream side to a downstream side of the butterfly valve 3 when fully closed than the first embodiment.

In this case, the sealing member 37 may be structured to rotate together with the inner bearing ring 31 to be in sliding contact with an outer bearing ring 30. This is because, if the sealing member 37 is structured to rotate together with the outer bearing ring 30, the wear of the sealing member 37 increases due to the slide between the sealing member 37 and the butterfly valve 3.

(Third Embodiment)

Figure 8:
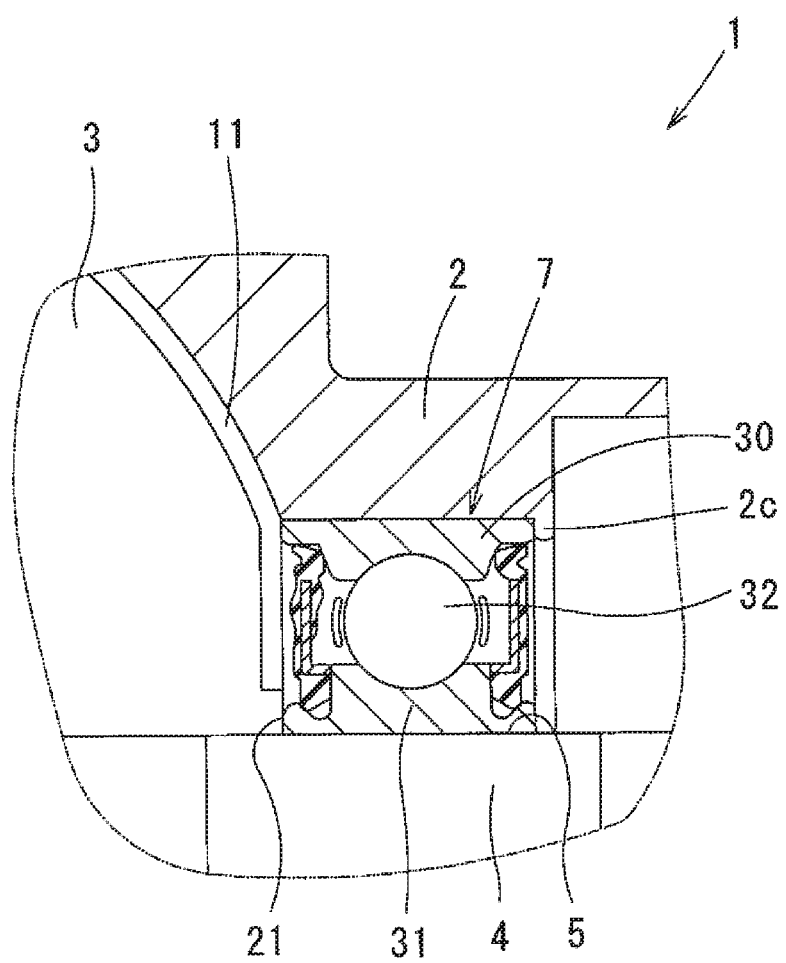
FIG. 8 is an enlarged sectional view illustrating a main part of a valve device in accordance with a third embodiment.

A valve device 1 of a third embodiment will be described with reference to FIG. 8 with a focus on its differences from the first embodiment. The same reference numerals as the first embodiment indicate their corresponding functional components, and their foregoing explanations are referred to. In the first embodiment, an outer bearing ring 30 is press-fitted and fixed into a first shaft hole 5 to restrict the axial displacement of the outer bearing ring 30 relative to a body 2.

However, in the present embodiment, locking the axial end surface of the outer bearing ring 30 on its opposite side from a cylindrical space (flow passage forming chamber 11) by a crimp piece 2c, which is provided at the body 2, restricts the displacement of the outer bearing ring 30 toward the opposite side from the cylindrical space in the axial direction. Although not shown, a second bearing member 8 also has a similar structure to the above.

In the present embodiment, the displacement of the outer bearing ring 30 toward the flow passage forming chamber 11 is permitted to a certain extent. Nevertheless, the side surface of a butterfly valve 3 is opposed to the outer bearing ring 30, and thus the outer bearing ring 30 is not removed from the first shaft hole 5.

(Fourth Embodiment)

Figure 9:
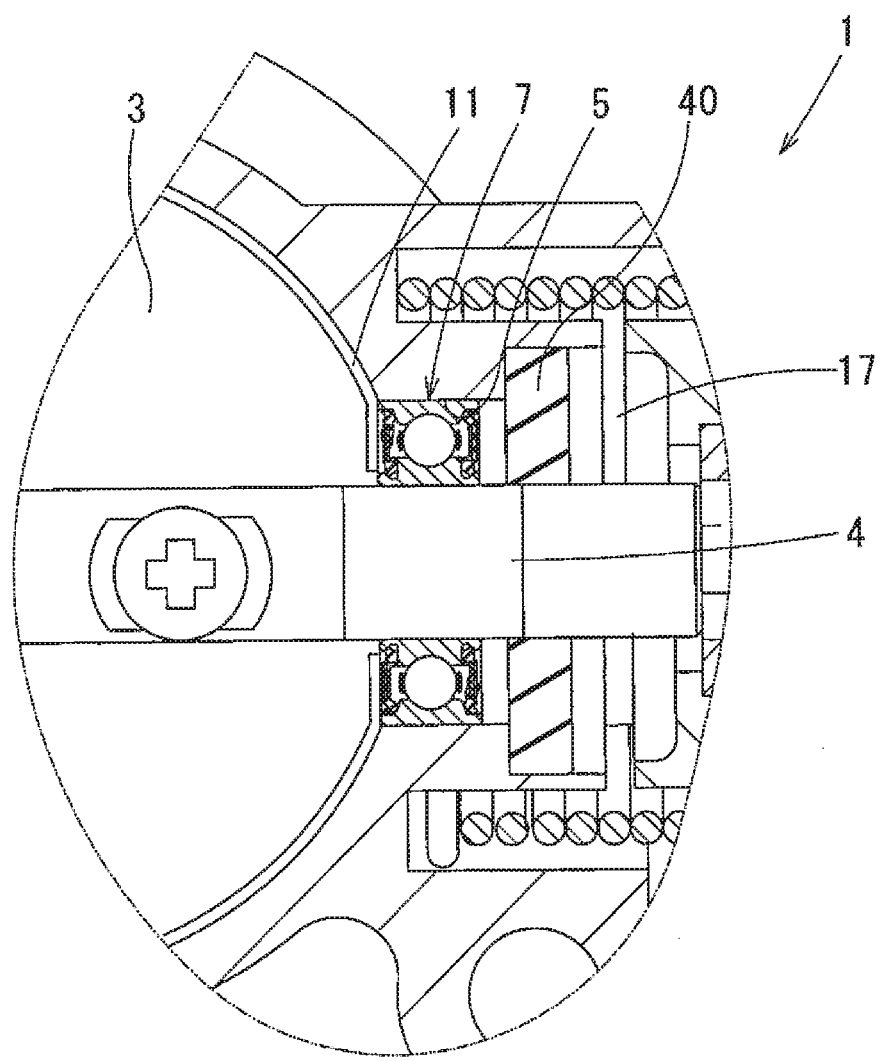
FIG. 9 is an enlarged sectional view illustrating a main part of a valve device in accordance with a fourth embodiment.

A valve device 1 of a fourth embodiment will be described with reference to FIG. 9 with a focus on its differences from the first embodiment. The same reference numerals as the first embodiment indicate their corresponding functional components, and their foregoing explanations are referred to. In the present embodiment, a shaft seal 40 that seals the periphery of a rotation shaft 4 is disposed on an opposite side of a first bearing member 7 from a flow passage forming chamber 11. The present embodiment can reliably prevent the leak of fluid flowing from the flow passage forming chamber 11 through a first shaft hole 5 toward an actuator chamber 17.

(Fifth Embodiment)

Figure 10:
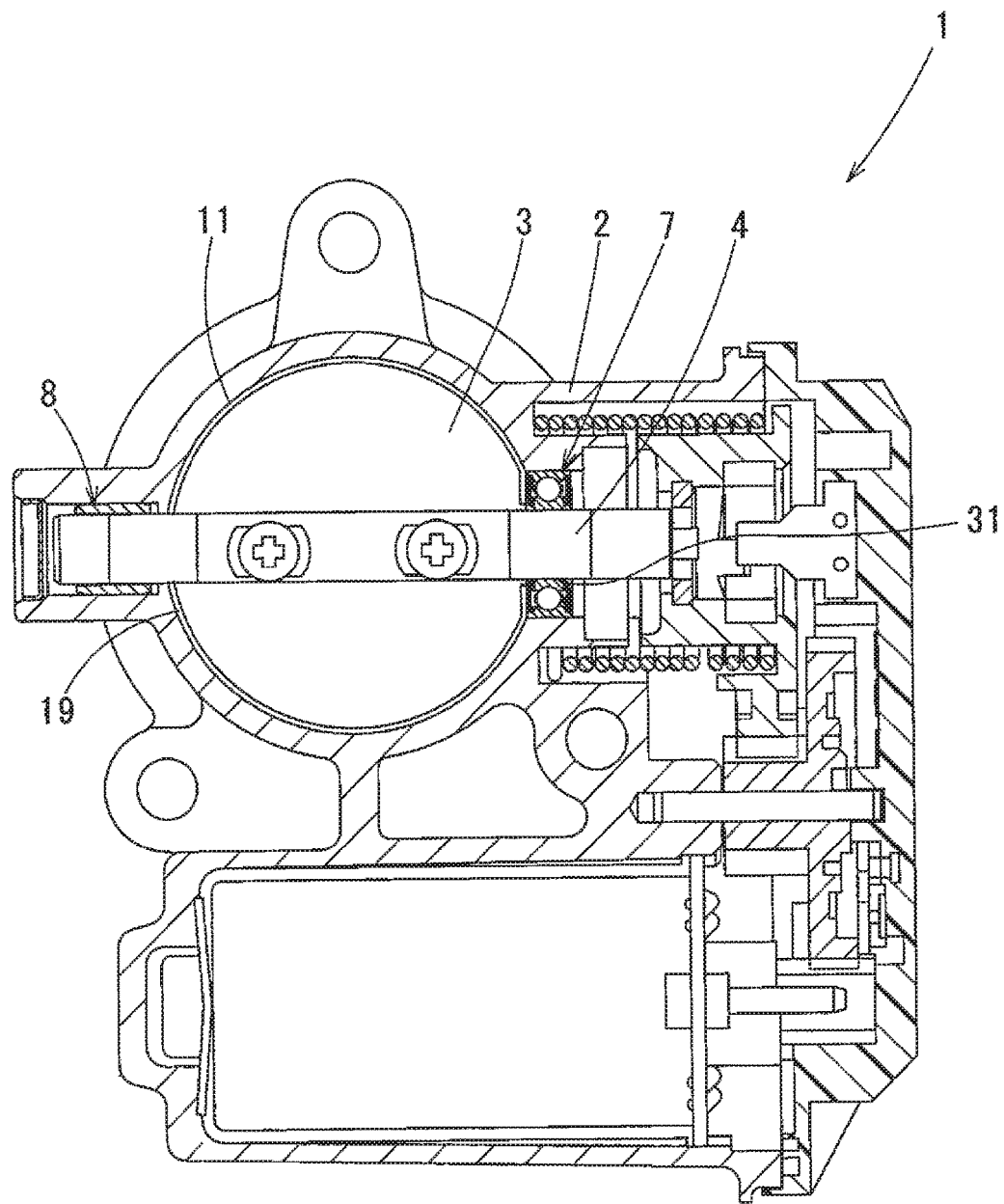
FIG. 10 is a sectional view illustrating an entire configuration of a valve device in accordance with a fifth embodiment.

A valve device 1 of a fifth embodiment will be described with reference to FIG. 10 with a focus on its differences from the first embodiment. The same reference numerals as the first embodiment indicate their corresponding functional components, and their foregoing explanations are referred to. In the present embodiment, a second bearing member 8 for a rotation shaft 4 is not a radial ball bearing, and is not structured to be in contact with a butterfly valve 3. For example, the second bearing member 8 is a plain bearing, and the side surface of the butterfly valve 3 on the other axial end side is structured to be opposed to the inner wall of a flow passage forming chamber 11 with a clearance 19 therebetween.

Since a first bearing member 7 has the structure that is characteristic of the present disclosure (structure of the butterfly valve 3 in contact only with an inner bearing ring 31 of the radial ball bearing), this structure can also avoid the phenomenon of the butterfly valve 3 incapable of rotating due to the biting of the first bearing member 7 and the butterfly valve 3 when the butterfly valve 3 is thermally expanded.

(Sixth Embodiment)

Figure 11:
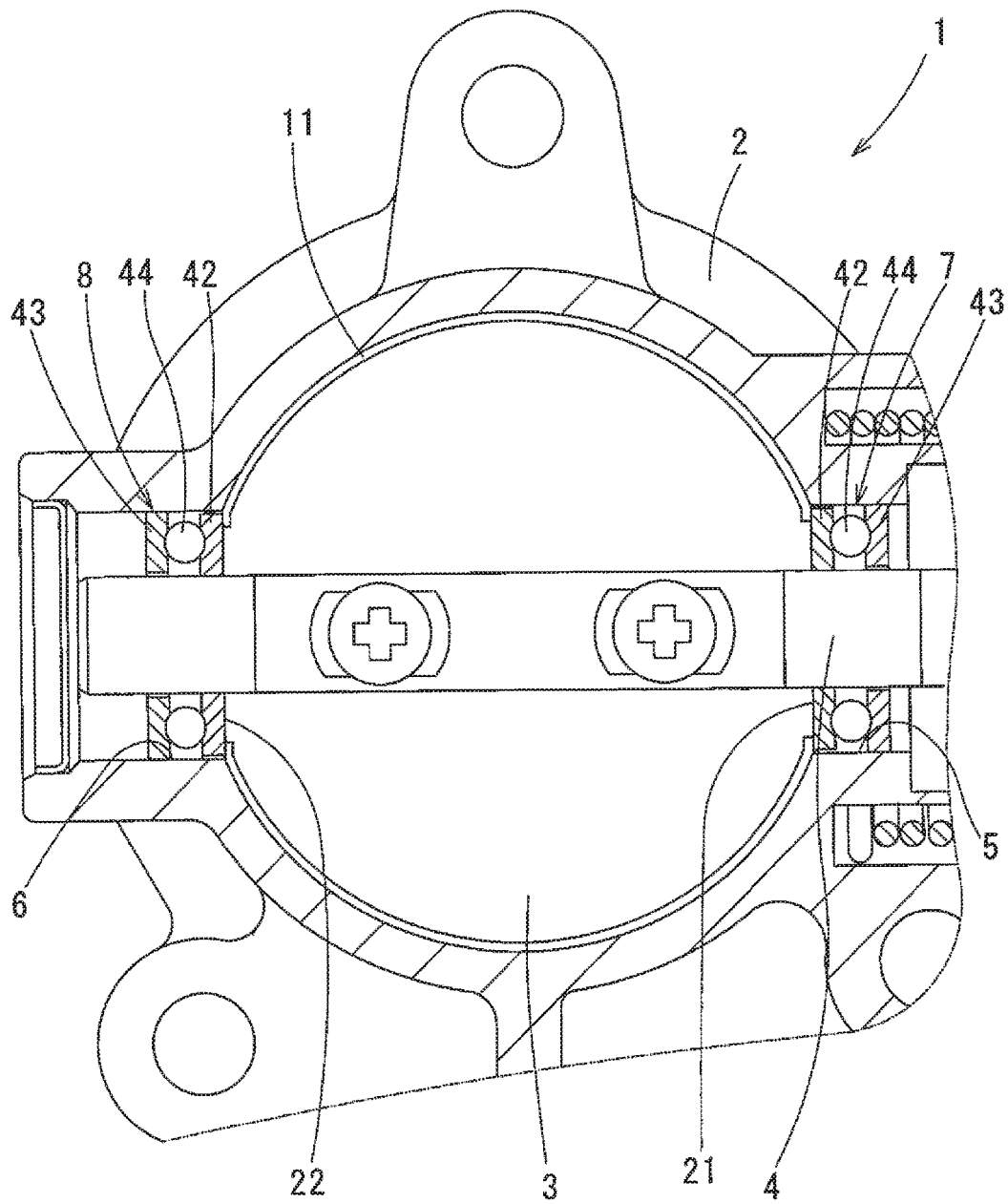
FIG. 11 is an enlarged sectional view illustrating a main part of a valve device in accordance with a sixth embodiment.

A valve device 1 of a sixth embodiment will be described with reference to FIG. 11 with a focus on its differences from the first embodiment. The same reference numerals as the first embodiment indicate their corresponding functional components, and their foregoing explanations are referred to.

A first bearing member 7 and a second bearing member 8 of the present embodiment are both thrust ball bearings. Each of the first bearing member 7 and the second bearing member 8 includes a shaft-side bearing ring 42, a body-side bearing ring 43, and a rolling element 44. The bearing structure using the first bearing member 7 and the bearing structure using the second bearing member 8 are similar. Thus, the bearing structure using the first bearing member 7 will be described below as a representative thereof.

The inner peripheral surface of the shaft-side bearing ring 42 is press-fitted and fixed to the outer peripheral surface of a rotation shaft 4. The body-side bearing ring 43 is disposed on an opposite side of the shaft-side bearing ring 42 from a flow passage forming chamber 11 in the axial direction. The outer peripheral surface of the body-side bearing ring 43 is press-fitted and fixed to the inner peripheral surface of a first shaft hole 5. The rolling elements 44 are disposed in the space that is located between the shaft-side bearing ring 42 and the body-side bearing ring 43 in the axial direction, and are more than one steel ball that roll between the shaft-side bearing ring 42 and the body-side bearing ring 43.

The surface of the shaft-side bearing ring 42 on the flow passage forming chamber 11-side is exposed to the flow passage forming chamber 11. A first contact part 21, with which a butterfly valve 3 is in contact, is provided on the surface of the shaft-side bearing ring 42 that is exposed to the flow passage forming chamber 11.

The bearing structure using the first bearing member 7 has been described above as a representative, but the bearing structure using the second bearing member 8 is similar to this. Specifically, the second bearing member 8 includes the shaft-side bearing ring 42, the inner peripheral surface of which is press-fitted and fixed to the outer peripheral surface of the rotation shaft 4, the body-side bearing ring 43, the outer peripheral surface of which is press-fitted and fixed to the inner peripheral surface of a second shaft hole 6, and the rolling element 44. The surface of the shaft-side bearing ring 42 on the flow passage forming chamber 11-side is exposed to the flow passage forming chamber 11. A second contact part 22, with which the butterfly valve 3 is in contact, is provided on the surface of the shaft-side bearing ring 42 that is exposed to the flow passage forming chamber 11.

The operation and effects of the sixth embodiment will be described below. The valve device 1 of the present embodiment is configured such that the butterfly valve 3 is in contact with at least a part of the surfaces of the first bearing member 7 and the second bearing member 8 on the flow passage forming chamber 11-side. This can thus reduce the leakage of fluid from an upstream side to a downstream side of the butterfly valve 3 when fully closed, as compared with the conventional structure (structure having the clearance 110 between the bearing 106 and the butterfly valve 102 as illustrated in FIG. 16).

The butterfly valve 3 is in contact only with the shaft-side bearing ring 42. Thus, even though the butterfly valve 3 is crimped against the shaft-side bearing ring 42 due to the thermal expansion of the butterfly valve 3, the shaft-side bearing ring 42 can rotate relative to the body-side bearing ring 43 and thus the butterfly valve 3 can also rotate together with the shaft-side bearing ring 42. Therefore, there is provided the structure that can reduce the leakage of fluid from the upstream side to the downstream side of the butterfly valve 3 when fully closed and that can avoid the phenomenon of the butterfly valve 3 incapable of rotating when thermally expanded.

(Seventh Embodiment)

Figure 12:
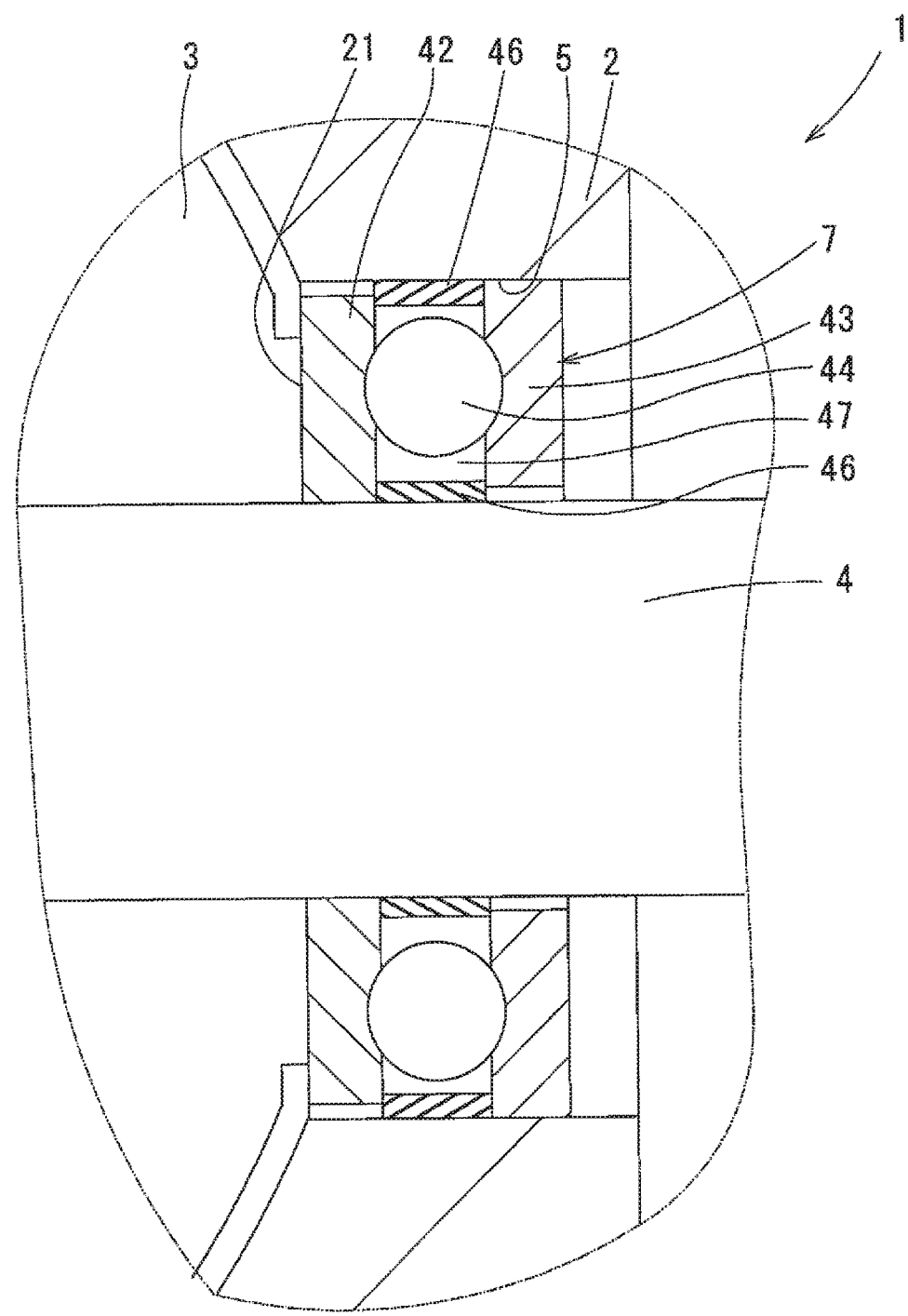
FIG. 12 is an enlarged sectional view illustrating a main part of a valve device in accordance with a seventh embodiment.

A valve device 1 of a seventh embodiment will be described with reference to FIGS. 12 and 13 with a focus on its differences from the sixth embodiment. The same reference numerals as the sixth embodiment indicate their corresponding functional components, and their foregoing explanations are referred to. The thrust ball bearings serving as a first bearing member 7 and a second bearing member 8 of the present embodiment include sealing members 46 that prevent the leak of fluid from a flow passage forming chamber 11 toward the space on an opposite side of the thrust ball bearing from the flow passage forming chamber 11.

In the following description, the thrust ball bearing configured as the first bearing member 7 will be explained as an example. For example, the sealing members 46 are arranged both radially outward and radially inward of the rolling element 44 in a space 47 that accommodates a rolling element 44, which is located between a shaft-side bearing ring 42 and a body-side bearing ring 43 in the axial direction, as illustrated in FIG. 12.

The sealing members 46 are in contact with the end surface of the shaft-side bearing ring 42 opposed to the body-side bearing ring 43, and with the end surface of the body-side bearing ring 43 opposed to the shaft-side bearing ring 42. The sealing member 46 may be disposed only either one of radially outward and radially inward of the rolling element 44.

Figure 13:
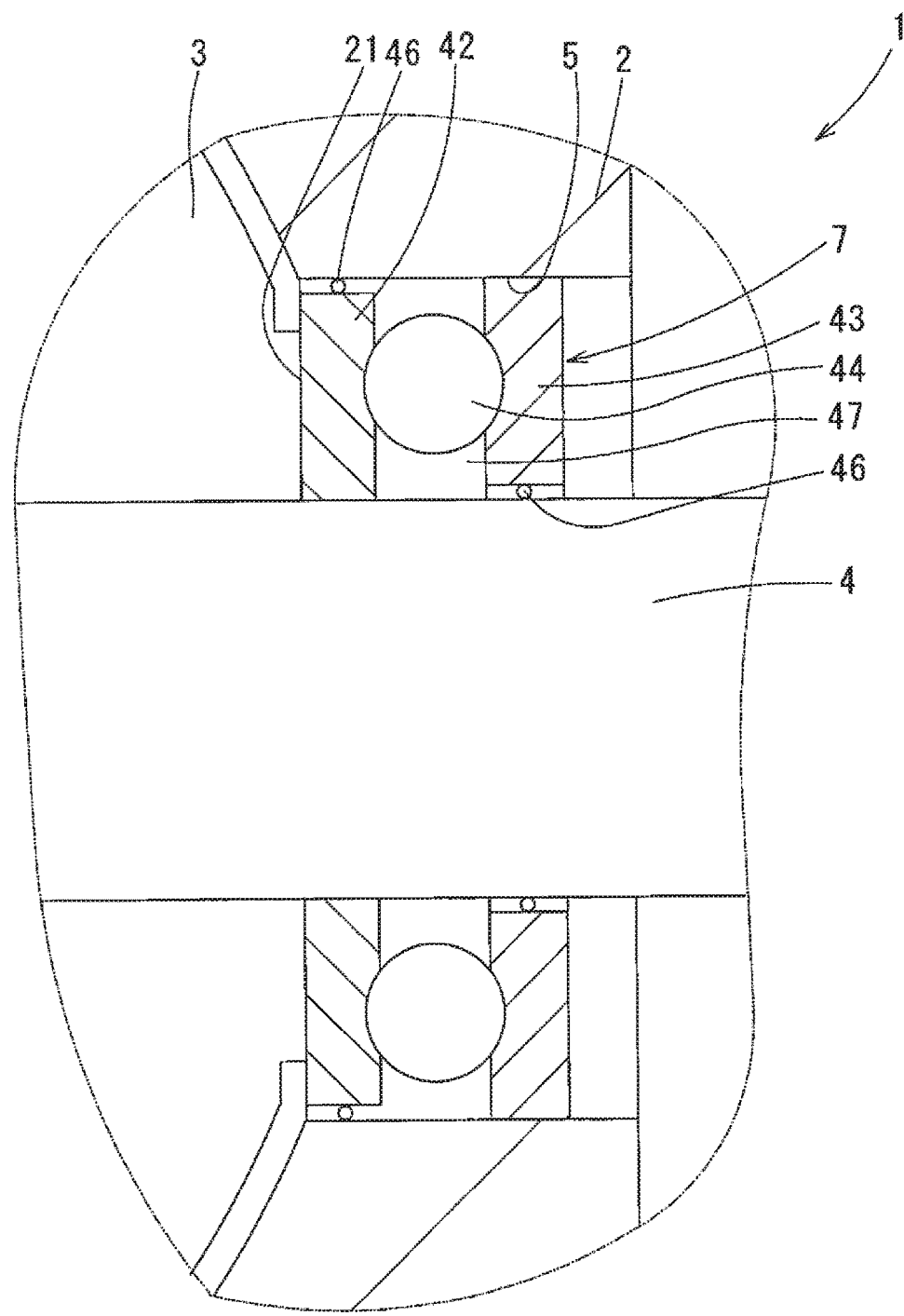
FIG. 13 is an enlarged sectional view illustrating the main part of the valve device of the seventh embodiment.

For example, the sealing members 46 may be arranged between the outer peripheral surface of the shaft-side bearing ring 42 and the inner peripheral surface of a first shaft hole 5 (second shaft hole 6 for the second bearing member 8), and between the inner peripheral surface of the body-side bearing ring 43 and the outer peripheral surface of a rotation shaft 4, as illustrated in FIG. 13. The sealing member 46 may be disposed only either one of between the outer peripheral surface of the shaft-side bearing ring 42 and the inner peripheral surface of the first shaft hole 5 (second shaft hole 6 for the second bearing member 8), and between the inner peripheral surface of the body-side bearing ring 43 and the outer peripheral surface of the rotation shaft 4.

In addition to the operation and effects of the sixth embodiment, the present embodiment can prevent the leak of fluid flowing from the flow passage forming chamber 11 through around the rotation shaft 4 to the outside of the flow passage forming chamber 11.

(Eighth Embodiment)

Figure 14:
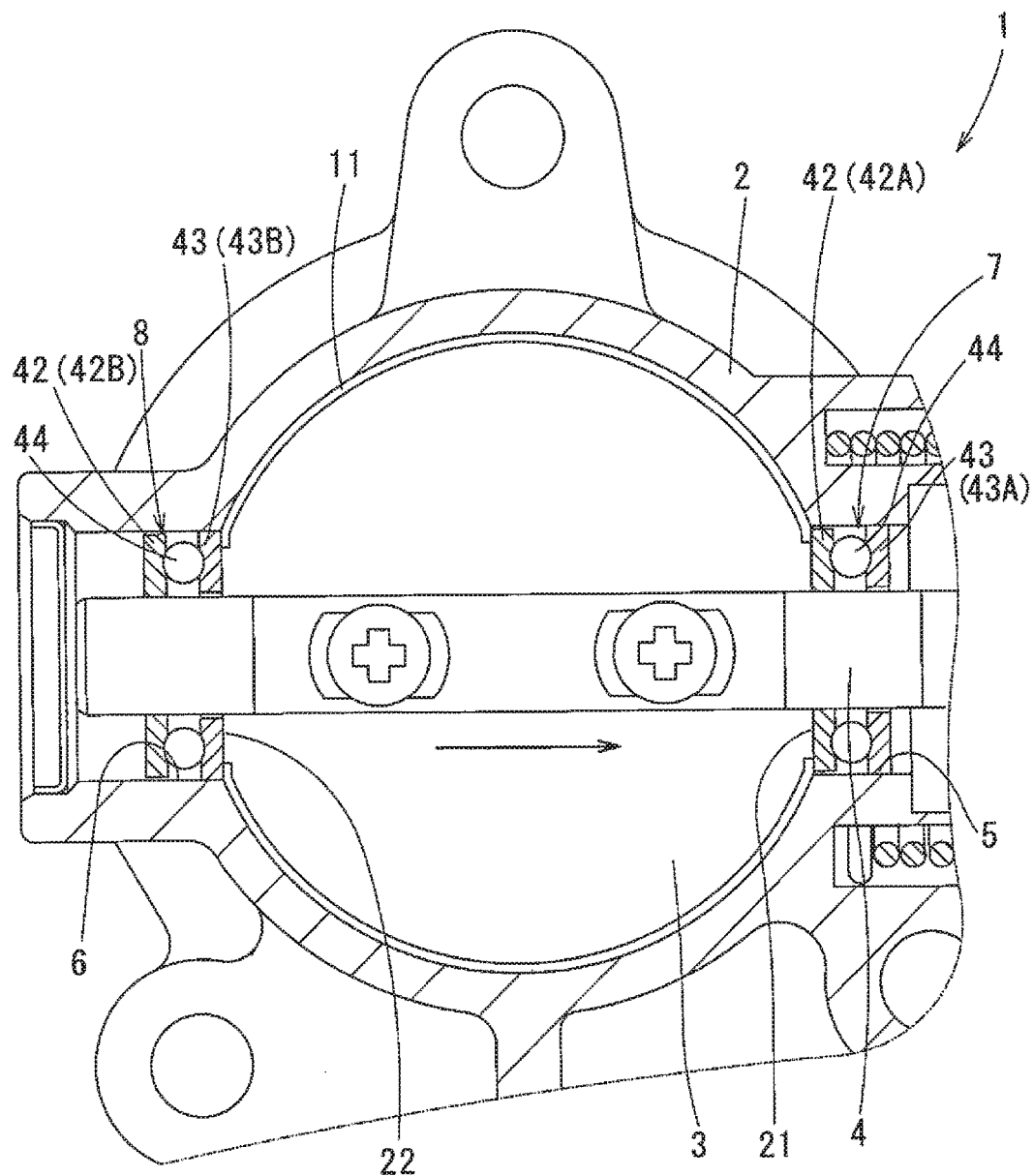
FIG. 14 is an enlarged sectional view illustrating a main part of a valve device in accordance with an eighth embodiment.

A valve device 1 of an eighth embodiment will be described with reference to FIG. 14 with a focus on its differences from the sixth embodiment. The same reference numerals as the sixth embodiment indicate their corresponding functional components, and their foregoing explanations are referred to. In the sixth embodiment, the shaft-side bearing ring 42 is in contact with the butterfly valve 3 in the first bearing member 7 as well as in the second bearing member 8. In the present embodiment, a body-side bearing ring 43 is in contact with a butterfly valve 3 in a second bearing member 8.

In the present embodiment, a shaft-side bearing ring 42 in a first bearing member 7 is also referred to as a shaft-side bearing ring 42A, a body-side bearing ring 43 in the first bearing member 7 is also referred to as a body-side bearing ring 43A, a shaft-side bearing ring 42 in the second bearing member 8 is also referred to as a shaft-side bearing ring 42B, and the body-side bearing ring 43 in the second bearing member 8 is also referred to as a body-side bearing ring 43B.

In the first bearing member 7, the shaft-side bearing ring 42A is located on a flow passage forming chamber 11-side of the body-side bearing ring 43A in the axial direction. The surface of the shaft-side bearing ring 42A on the flow passage forming chamber 11-side is exposed to the flow passage forming chamber 11, and a first contact part 21, with which the butterfly valve 3 is in contact, is provided on the surface of the shaft-side bearing ring 42A that is exposed to the flow passage forming chamber 11.

In the second bearing member 8, the body-side bearing ring 43B is located on the flow passage forming chamber 11-side of the shaft-side bearing ring 42B in the axial direction. The surface of the body-side bearing ring 43B on the flow passage forming chamber 11-side is exposed to the flow passage forming chamber 11, and a second contact part 22, with which the butterfly valve 3 is in contact, is provided on the surface of the body-side bearing ring 43B that is exposed to the flow passage forming chamber 11.

As a consequence of this structure, the butterfly valve 3 can move slightly in the axial direction due to the axial play of the first bearing member 7 and the second bearing member 8. Thus, the butterfly valve 3, a rotation shaft 4, the shaft-side bearing ring 42A, and the shaft-side bearing ring 42B are permitted to integrally move slightly in the axial direction. The axial play of the first bearing member 7 and the second bearing member 8 is a backlash formed between the body-side bearing ring 43 and a rolling element 44 or between the rolling element 44 and the shaft-side bearing ring 42.

Thus, when the butterfly valve 3 is pressed on the shaft-side bearing ring 42A and on the body-side bearing ring 43B due to the thermal expansion of the butterfly valve 3, the butterfly valve 3 moves by the play together with the shaft-side bearing ring 42A and the shaft-side bearing ring 42B. The thermally expanded amount of the butterfly valve 3 can thereby be absorbed. Therefore, there is provided the structure that can reduce the leakage of fluid from an upstream side to a downstream side of the butterfly valve 3 when fully closed and that can avoid the phenomenon of the butterfly valve 3 incapable of rotating when thermally expanded.

(Ninth Embodiment)

Figure 15:
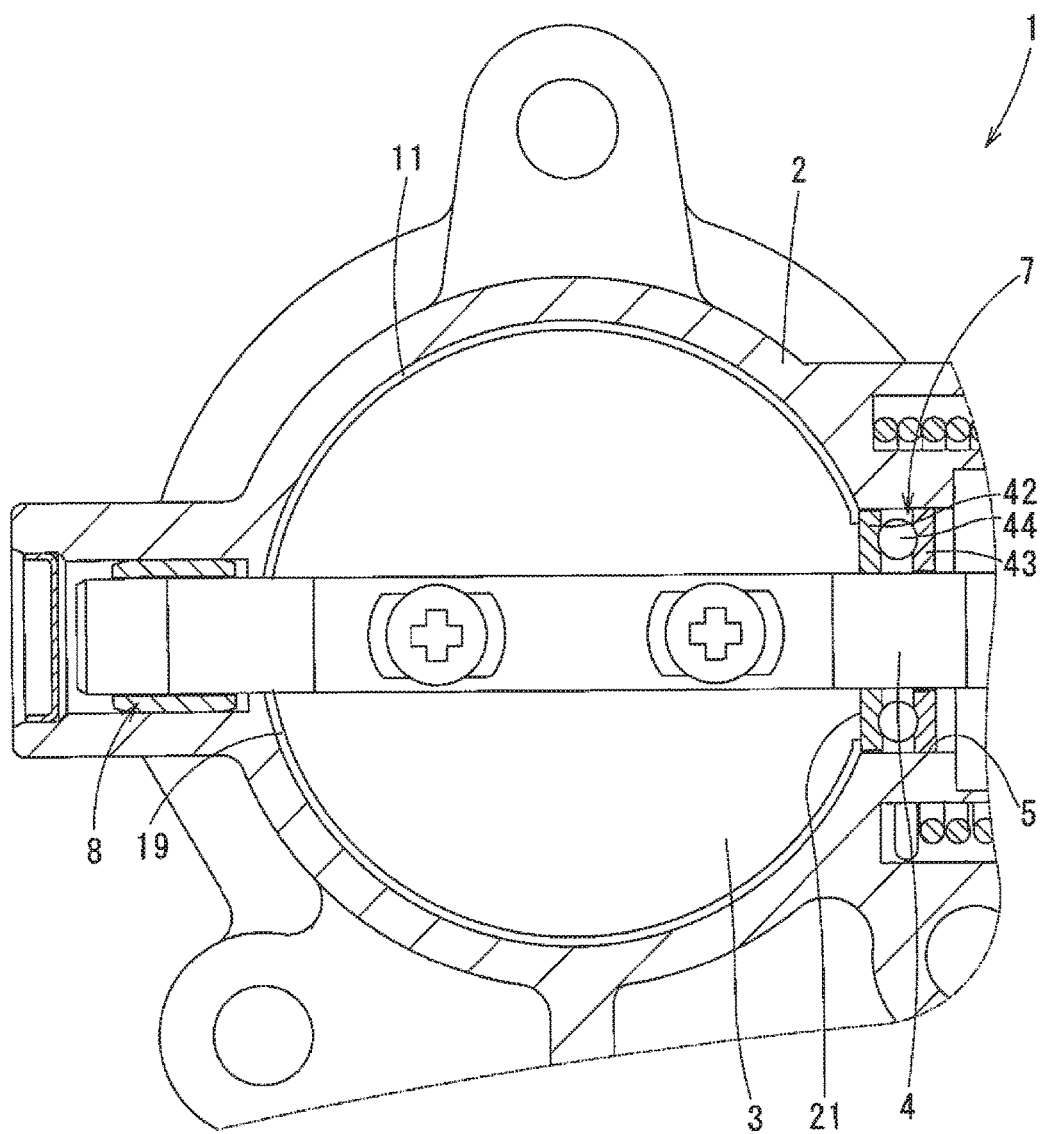
FIG. 15 is an enlarged sectional view illustrating a main part of a valve device in accordance with a ninth embodiment.

A valve device 1 of a ninth embodiment will be described with reference to FIG. 15 with a focus on its differences from the sixth embodiment. The same reference numerals as the first embodiment indicate their corresponding functional components, and their foregoing explanations are referred to. In the present embodiment, a second bearing member 8 is not a thrust ball bearing, and is not structured to be in contact with a butterfly valve 3. For example, the second bearing member 8 is a plain bearing, and the side surface of the butterfly valve 3 on the other axial end side is structured to be opposed to the inner wall of a flow passage forming chamber 11 with a clearance 19 therebetween.

Since a first bearing member 7 has the structure that is characteristic of the present disclosure (structure of the butterfly valve 3 in contact only with a shaft-side bearing ring 42), this structure can also avoid the phenomenon of the butterfly valve 3 incapable of rotating due to the biting of the first bearing member 7 and the butterfly valve 3 when the butterfly valve 3 is thermally expanded.

Modifications to the above embodiments will be described below. The inner bearing ring 31 of the first embodiment is permitted to be displaced in the axial direction relative to the rotation shaft 4, but the inner bearing ring 31 may be press-fitted and fixed to the rotation shaft 4. The valve device 1 is a throttle valve device, but is not limited to this example. For example, the valve device 1 may be an EGR valve device that varies the amount of exhaust gas recirculating from an exhaust passage to an intake passage. The valve device 1 can also be applied to a gasoline engine.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. A valve device comprising:
a body that includes a flow passage forming chamber, which is configured as a part of a fluid flow passage communicating with a combustion chamber of an internal-combustion engine;
a butterfly valve that is accommodated rotatably in the flow passage forming chamber to adjust a flow rate through the fluid flow passage;
a rotation shaft that rotates integrally with the butterfly valve;
a shaft hole which is formed in the body to open into the flow passage forming chamber and through which the rotation shaft passes; and
a bearing member that is disposed in the shaft hole to support the rotation shaft, wherein:
a surface of the bearing member on the flow passage forming chamber-side is disposed to be exposed to the flow passage forming chamber;
the bearing member includes a contact part, with which a side surface of the butterfly valve that is opposed to the bearing member is in contact, on at least a part of the surface of the bearing member on the flow passage forming chamber-side;
the bearing member is a radial ball bearing and includes:

an outer bearing ring that is fitted to an inner periphery of the shaft hole, so that its axial displacement relative to the body is restricted;

an inner bearing ring that is fitted on an outer periphery of the rotation shaft radially inward of the outer bearing ring; and a rolling element that is disposed between the outer bearing ring and the inner bearing ring; and the contact part is provided on a surface of the inner bearing ring on the flow passage forming chamber-side.

2. The valve device according to claim 1, wherein the inner bearing ring is permitted to be axially displaced relative to the rotation shaft.

3. The valve device according to claim 1, wherein the bearing member includes a sealing member that seals a flow passage forming chamber-side opening of a space, which is located between the inner bearing ring and the outer bearing ring and in which the rolling element is located.

4. The valve device according to claim 3, wherein the side surface of the butterfly valve that is opposed to the bearing member is in contact with the sealing member as well as with the contact part provided at the inner bearing ring.

5. The valve device according to claim 4, wherein the sealing member is fixed to the inner bearing ring to rotate together with the inner bearing ring.

6. The valve device according to claim 1, wherein axial displacement of the outer bearing ring toward its opposite side from the flow passage forming chamber is restricted.

7. A valve device comprising:
a body that includes a flow passage forming chamber, which is configured as a part of a fluid flow passage communicating with a combustion chamber of an internal-combustion engine;
a butterfly valve that is accommodated rotatably in the flow passage forming chamber to adjust a flow rate through the fluid flow passage;
a rotation shaft that rotates integrally with the butterfly valve;
a shaft hole which is formed in the body to open into the flow passage forming chamber and through which the rotation shaft passes; and
a bearing member that is disposed in the shaft hole to support the rotation shaft, wherein:
a surface of the bearing member on the flow passage forming chamber-side is disposed to be exposed to the flow passage forming chamber;
the bearing member include a contact part, with which a side surface of the butterfly valve that is opposed to the bearing member is in contact, on at least a part of the surface of the bearing member on the flow passage forming chamber-side;
the bearing member is a thrust ball bearing and includes:
a shaft-side bearing ring that is fixed to the rotation shaft;
a body-side bearing ring that is fixed to the body; and
a rolling element that is disposed between the shaft-side bearing ring and the body-side bearing ring; and
the contact part is provided at the shaft-side bearing ring.

8. The valve device according to claim 7, wherein the thrust ball bearing includes a sealing member that prevents a leak of fluid from the flow passage forming chamber toward a space on an opposite side of the thrust ball bearing from the flow passage forming chamber.

9. A valve device comprising:
a body that includes a flow passage forming chamber, which is configured as a part of a fluid flow passage communicating with a combustion chamber of an internal-combustion engine;
a butterfly valve that is accommodated rotatably in the flow passage forming chamber to adjust a flow rate through the fluid flow passage;
a rotation shaft that rotates integrally with the butterfly valve;
a first shaft hole which is formed in the body to open into the flow passage forming chamber and in which one axial end part of the rotation shaft is accommodated;
a second shaft hole which is formed in the body to open into the flow passage forming chamber and in which the other axial end part of the rotation shaft is accommodated;
a first bearing member that is disposed in the first shaft hole to support the rotation shaft; and
a second bearing member that is disposed in the second shaft hole to support the rotation shaft, wherein:
a surface of the first bearing member on the flow passage forming chamber-side and a surface of the second bearing member on the flow passage forming chamber-side are both disposed to be exposed to the flow passage forming chamber;
the first bearing member includes a first contact part, with which a side surface of the butterfly valve that is opposed to the first bearing member is in contact, on at least a part of the surface of the first bearing member on the flow passage forming chamber-side;
the second bearing member includes a second contact part, with which a side surface of the butterfly valve that is opposed to the second bearing member is in contact, on at least a part of the surface of the second bearing member on the flow passage forming chamber-side;
each of the first bearing member and the second bearing member is a thrust ball bearing, and includes:
a shaft-side bearing ring that is fixed to the rotation shaft;
a body-side bearing ring that is fixed to the body; and
a rolling element that is disposed between the shaft-side bearing ring and the body-side bearing ring;
the first contact part is provided at the shaft-side bearing ring in the first bearing member; and
the second contact part is provided at the body-side bearing ring in the second bearing member.

10. The valve device according to claim 9, wherein the thrust ball bearing includes a sealing member that prevents a leak of fluid from the flow passage forming chamber toward a space on an opposite side of the thrust ball bearing from the flow passage forming chamber.

* * * * *